United States Patent Office 2,760,095
Patented Aug. 21, 1956

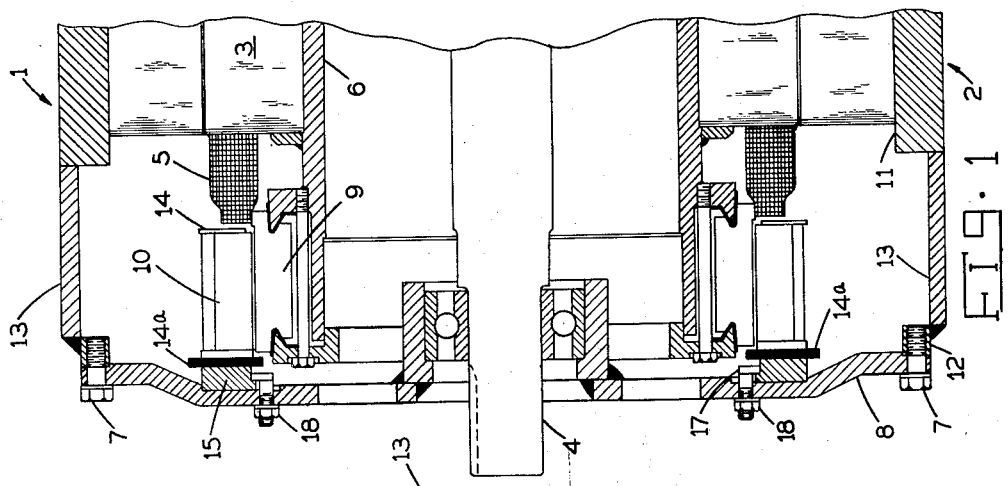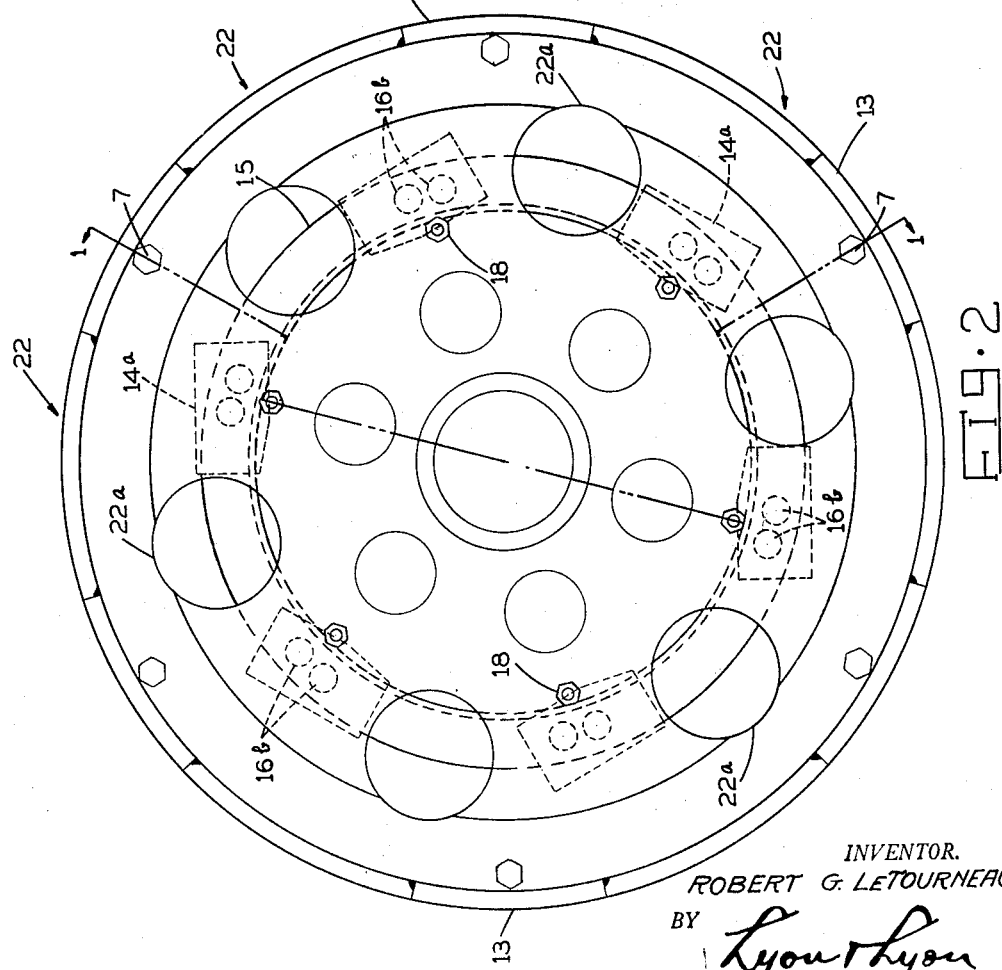

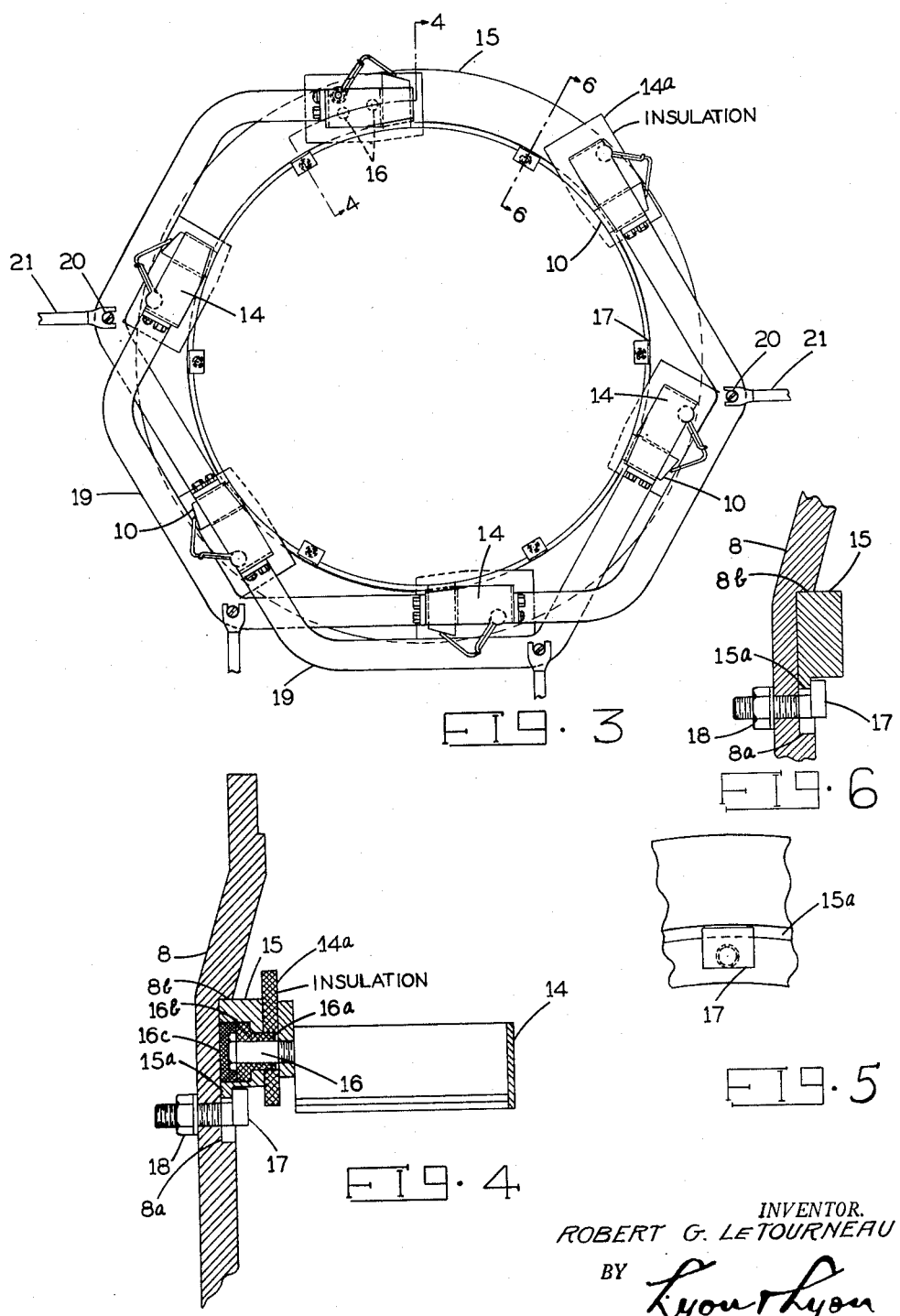

2,760,095

ROTATABLE BRUSH MOUNTING RING

Robert G. Le Tourneau, Longview, Tex.

Application October 3, 1952, Serial No. 312,989

10 Claims. (Cl. 310—241)

This invention relates generally to brush mechanisms for dynamoelectric machines, and more particularly to a rotatable brush mounting ring.

One of the problems encountered in servicing the brushes of a dynamoelectric machine is that the machines are often mounted in places which are not easily accessible. Thus it is not always easy for a mechanic to reach all the brushes around the circumference of the commutator. Further it is time consuming and expensive to dismount the machine from its driving connections every time the brushes need servicing.

Another problem in the maintenance of dynamoelectric machines is that the brush holders and the brush holder insulation often need servicing and they are not easily accessible from all sides of the machine.

It is therefore one of the objects of this invention to overcome the above problem by providing a dynamoelectric machine in which the brushes can be serviced from one location.

Another object of my invention is to provide in a dynamoelectric machine a brush mounting ring which may be rotated through 360°.

A further object is to provide in a dynamoelectric machine a mounting ring for brush holders and brushes which may be readily moved independently of the frame so that the brushes may be adjusted as a unit.

A further object is to provide in a dynamoelectric machine a brush mounting ring having novel releasable means readily accessible from outside the machine.

Another object is to provide a dynamoelectric machine having a rotatable brush mounting ring and having appropriate openings in the main frame whereby the brushes and brush holders may be serviced from one location.

Other objects and advantages will become apparent upon perusal of the specification and claims.

In the drawings:

Fig. 1 is a fragmentary side view of the generator embodying my invention partly in section, taken along line 1—1 of Fig. 2.

Fig. 2 is a front view of the generator showing the brush mounting ring and part of its mounting structure dotted in.

Fig. 3 is a plan view of the brush mounting ring, brushes and connector bars and showing the rectangular head bolts, used for securing the ring to the end bell, rotated through several degrees from the position shown in Figs. 1 and 2.

Fig. 4 is a fragmentary detail, sectional view, taken on the line 4—4 of Fig. 3, and further showing a partial, sectional view of the end bell.

Fig. 5 is an enlarged fragmentary view of one of the rectangular head bolts of Fig. 3 showing its relation to the mounting ring.

Fig. 6 is a fragmentary detail, sectional view, taken on the line 6—6 of Fig. 3, and further showing a partial sectional view of the end bell.

Referring more particularly to the drawings it may be seen in Fig. 1 that the reference numeral 1 denotes a dynamoelectric machine in the form of a generator. This generator has a main frame 2, an armature assembly 3 comprising shaft 4, winding 5 and hub 6. An end bell 8 is bolted by bolts 7 to the main frame 2 and forms a part thereof. Commutator segments 9 are supported on armature hub 6 in a conventional manner, and are engaged by brushes 10 spaced around the commutator. The main frame 2 has a pole ring 11 and a bolt ring 12 rigidly connected by six tie bars 13 equally spaced around the circumference. The pole ring, tie bars and bolt ring are in practice formed in a single rigid structure. This construction leaves six openings or windows 22 any one of which can be used for servicing the brushes, as will be described later. Equally spaced holes 22a are formed in the end bell 8 and spaced such a distance outwardly from the center of the end bell that each hole is in axial alignment with a portion of the brush mounting ring hereinafter described. These holes 22a perform the dual function of ventilating the machine and providing accessibility to the brush holders.

Before the end bell 8 is assembled on the generator, the brush mounting means of my invention is assembled on the end bell. This brush mounting means comprises a rotatable mounting ring 15 which may be rotated 360° with respect to the end bell and generator frame. End bell 8 has an annular recess 8a formed therein leaving an annular shoulder 8b on the end bell. The brush mounting ring 15 is positioned in the recess 8a to bear against the shoulder 8b which forms a guide for the ring during its rotation. Brush mounting ring 15 has an annular flange 15a formed thereon projecting toward the axis of the ring for reception of releasable means for attaching the ring to the end bell 8 (shown best in Figs. 4 and 5). This releasable means comprises rectangular head bolts 17 and nuts 18. Bolts 17 are extended through holes in the end bell from the inner side and are drawn tight so that the rectangular bolt heads bear against the ring flange 15a and so that one side of each bolt head is contiguous to the inner periphery of the mounting ring 15 as shown in Fig. 5. When torque is applied to the nuts 18 for either tightening or loosening them, the heads of the bolts 17 are kept from turning because the inner periphery of the ring 15 serves as a stop as it engages the outer corners of the adjacent sides of the bolt heads. When each of the bolts 17 is drawn tight to secure the ring 15 in place, the end bell may be assembled on the generator by bolts 7. After assembly the brush mounting ring 15 may be rotated to properly position the brushes as described hereinafter.

It will be observed from Figs. 4 and 6 that the rectangular head of each bolt 17 is offset and that its lower side is flush with the threaded portion of the bolt. This construction promotes easy assembly and removal of the ring 15. Thus to remove the ring from the end bell 8 after the end bell has been detached from the generator, each bolt 17 is pushed inwardly away from flange 15a by loosening nut 18. When the rectangular head of each bolt clears the innermost portion of ring 15, the bolts may be rotated through 180° to provide clearance for the removal of ring 15.

Brush holders 14 are separated from the mounting ring 15 by insulating plates 14a, and are then secured to the ring 15 by capscrews 16. These capscrews 16 are surrounded by insulating bushings 16a inserted in shouldered holes 16b in the ring, and have insulating plugs 16c press fitted over their heads to insulate them from the end bell 8. The brush holders 14 are equally spaced around the circumference of brush mounting ring 15, and each brush holder houses and supports one of the brushes 10 which engage the commutator. Alternate brush holders are interconnected by rigid connector bars 19. Each connector bar has an input terminal 20 for connection of leads 21.

An outstanding feature of this brush mounting ring is its construction and attachment to the generator end bell whereby the ring and its brush holders may be rotated through 360° without removing the end bell by loosening the external nuts 18 of the rectangular head bolts 17 which normally hold the mounting ring 15 in rigid relation with the end bell 8. As torque is applied to the nuts 18 to loosen them, the inner periphery of the ring 15 prevents the head of bolt 17 from turning as pointed out above. These nuts are loosened enough to disengage the bolt head from the ring shoulder 15a and to permit the ring to rotate freely through 360° around the recess 8a in the end bell 8. As the ring rotates it will be guided by the end bell shoulder 8b and by the head of the bolt 17 which will prevent ring shoulder 15a from moving more than a short distance axially. This feature permits a mechanic to readily change any brush of the generator by a simple, easy operation. After disconnecting the input leads 21 from the connector bar terminals, there are no remaining wires to disconnect since the connector bars form the entire interconnecting means between the brush holders. Thus the entire brush mechanism may be rotated as a unit through 360°, and all brushes can be serviced through one of the windows 22.

Another important advantage of the rotatable mounting ring is that the brush holders and the insulating plates 14a can be serviced readily from a given location. Thus as the ring 15 is rotated the insulating plates 14a may be lined up in the center of holes 22a in the end bell 8. Plugs 16c can then be removed to gain access to the capscrews 16 for removal and assembly of the insulating plates 14a and the brush holders 14.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In a dynamoelectric machine having a detachable end bell, a rotatable brush mounting ring, and releasable means attaching the ring to the end bell, whereby the ring may be rotated through 360° with respect to the end bell, said releasable means comprising rectangular head bolts extending through the end bell, said mounting ring having an annular flange formed thereon projecting toward the axis of the ring, said flange being engaged by said bolts, one side of the head of each bolt being contiguous to the inner periphery of the ring whereby the bolt is prevented from turning upon rotation of the ring, or upon releasing or securing said releasable means.

2. In a dynamoelectric machine as set forth in claim 1 said rectangular heads being offset from the bolt center so that the bolts may be rotated through 180° when clear of the ring and flange to permit easy assembly and removal of the ring.

3. In a dynamoelectric machine having a detachable end bell with an annular recess formed in the inner surface thereof, an annular shoulder on the end bell formed by said recess, a rotatable brush mounting ring positioned in the recess in engagement with said shoulder, an annular flange formed on the ring and projecting toward the axis thereof, bolts extending through said end bell and secured by nuts on the outer side of the end bell, said bolts having rectangular heads bearing against said flange, one side of each head being contiguous to the inner periphery of the ring, circumferentially spaced brush holders mounted on the ring and adapted for housing brushes, and rigid bars connecting alternate brush holders, said machine and said end bell having openings therein whereby upon loosening the nuts the ring and the brush holders may be rotated as a unit through 360° and said brushes and brush holders may be serviced from one location, the ring being guided in rotation by the shoulder and recess of the end bell and by the rectangular head bolts.

4. In a dynamoelectric machine as set forth in claim 3 said rectangular heads being offset from the bolt center so that the bolts may be rotated through 180° when clear of the ring and flange to permit easy assembly and removal of the ring.

5. In a dynamoelectric machine, the combination comprising a frame, an end bell releasably mounted on said frame and closing off substantially one end of said machine, said end bell having an inner wall and an outer wall, said end bell having an annular recess in its inner wall leaving an annular shoulder on said inner wall, a rotatable brush mounting ring disposed in said recess, said mounting ring having an annular flange formed thereon projecting towards the axis of the ring, means releasably securing said ring on the inner wall of said end bell, the last-mentioned means comprising a bolt extending through the end bell with the head of said bolt engaging said flange.

6. The arrangement as set forth in claim 5, in which said end bell has an apertured portion aligned with said recess to allow access of a portion of said ring from the outside surface of said end bell.

7. The arrangement as set forth in claim 6, including a brush holder, means securing said brush holder to said ring, said last-mentioned means comprising a bolt recessed in said ring and engageable with a tapped portion in said holder, said last-mentioned bolt having its axis extending generally parallel with the previously-mentioned bolt and aligned with said apertured portion.

8. In a dynamoelectric machine, the combination comprising a machine having a frame, an end bell having an inner surface and an outer surface and enclosing substantially one end of said machine, a brush mounting ring slidably mounted on the inner face of said end bell, a bolt extending through said end bell with its axis extending generally parallel to the rotational axis of said ring, said bolt having its head engageable with a portion of said ring and having fastening means on that end thereof which extends through said end bell, a brush holder, means mounting said brush holder on said ring, the last-mentioned means comprising a second bolt passing through said ring and engageable with a tapped portion of said holder, the last-mentioned bolt having its axis extending generally parallel with the aforementioned bolt and generally parallel to the rotational axis of the machine, and said end bell having an apertured portion adjacent said ring through which access may be had to the bolt which secures the holder to said ring.

9. The arrangement set forth in claim 8 in which said mounting means includes insulation disposed between said fastening bolt and said ring, and said apertured portion is sufficiently enlarged to allow said insulating material to be withdrawn through said apertured portion.

10. In a dynamoelectric machine having a detachable end bell, a rotatable brush mounting ring, circumferentially spaced brush holders removably mounted on the ring and adapted for housing brushes, insulation means separating the brush holders from said ring, rigid connector bars connecting alternate brush holders, and releasable means attaching the ring to the end bell, said machine and said end bell having openings therein whereby the ring and the brush holders together with the connector bars may be moved as a unit through 360° upon release of said releasable means and said brushes, brush holders and insulation means may be serviced from one location, said releasable means comprising rectangular head bolts, said mounting ring having an annular flange formed thereon projecting toward the axis of the ring, said flange being engaged by said bolts.

References Cited in the file of this patent

UNITED STATES PATENTS

| | | |
|---|---|---|
| 761,985 | Norris | June 7, 1904 |
| 880,437 | Ball | Feb. 25, 1908 |
| 917,005 | Coffman | Apr. 6, 1909 |
| 1,193,349 | Bliss | Aug. 1, 1916 |
| 1,268,330 | Darker | June 4, 1918 |
| 1,633,389 | Stumpf | June 21, 1927 |

FOREIGN PATENTS

| | | |
|---|---|---|
| 517,838 | Germany | Feb. 7, 1931 |
| 677,806 | Great Britain | Aug. 20, 1952 |